(12) United States Patent
Masuda et al.

(10) Patent No.: US 6,678,482 B2
(45) Date of Patent: Jan. 13, 2004

(54) IMAGE FORMING APPARATUS AND METHOD FOR DETERMINING SUITABILITY OF REPLACEABLE COMPONENT

(75) Inventors: Jitsuo Masuda, Yamatotakada (JP); Masayasu Narimatsu, Nara (JP); Hiroshi Kawamoto, Tenri (JP); Hiroaki Yoshida, Nara (JP); Masahiro Sakai, Osaka (JP); Naoki Fukudo, Nara (JP); Yuichiro Takesue, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/243,944

(22) Filed: Sep. 16, 2002

(65) Prior Publication Data

US 2003/0063914 A1 Apr. 3, 2003

(30) Foreign Application Priority Data

Sep. 17, 2001 (JP) ..................... P2001-281944

(51) Int. Cl.[7] .............................................. G03G 15/00
(52) U.S. Cl. ........................................... 399/12; 399/84
(58) Field of Search ........................... 399/12, 84, 106, 399/109, 110, 111, 262, 24

(56) References Cited

U.S. PATENT DOCUMENTS 5,761,566 A * 6/1998 Suzuki et al. ................. 399/12
5,999,759 A * 12/1999 Palumbo et al. ............. 399/262
6,324,351 B1   11/2001 Kurimoto et al. ............. 399/12
6,363,226 B1 *  3/2002 Batori ........................... 399/12

FOREIGN PATENT DOCUMENTS

| JP | 04-001682 | 1/1992 | |
| JP | 04-062564 | 2/1992 | |
| JP | 05224479 A | * 9/1993 | .......... G03G/15/00 |
| JP | 2000-187415 | 7/2000 | |

* cited by examiner

Primary Examiner—Sophia S. Chen
Assistant Examiner—Ryan Gleitz
(74) Attorney, Agent, or Firm—Nixon & Vanderhye, P.C.

(57) ABSTRACT

An object of the invention is to make an exact judgment on suitability of a replaceable component such as a toner supplying container with use of an existing mechanism of an image forming apparatus, without additionally providing a data storage component designed for a consumable product which is detachably attached to the apparatus, or a data reading component to be placed in the image forming apparatus main body. In an incorporated control section, a specific part of a replaceable component, which is placed on an original platform prior to being loaded into the apparatus, is optically scanned to read image information, and, based on the reading result, whether or not the replaceable component is suitable for the image forming apparatus is judged.

20 Claims, 11 Drawing Sheets

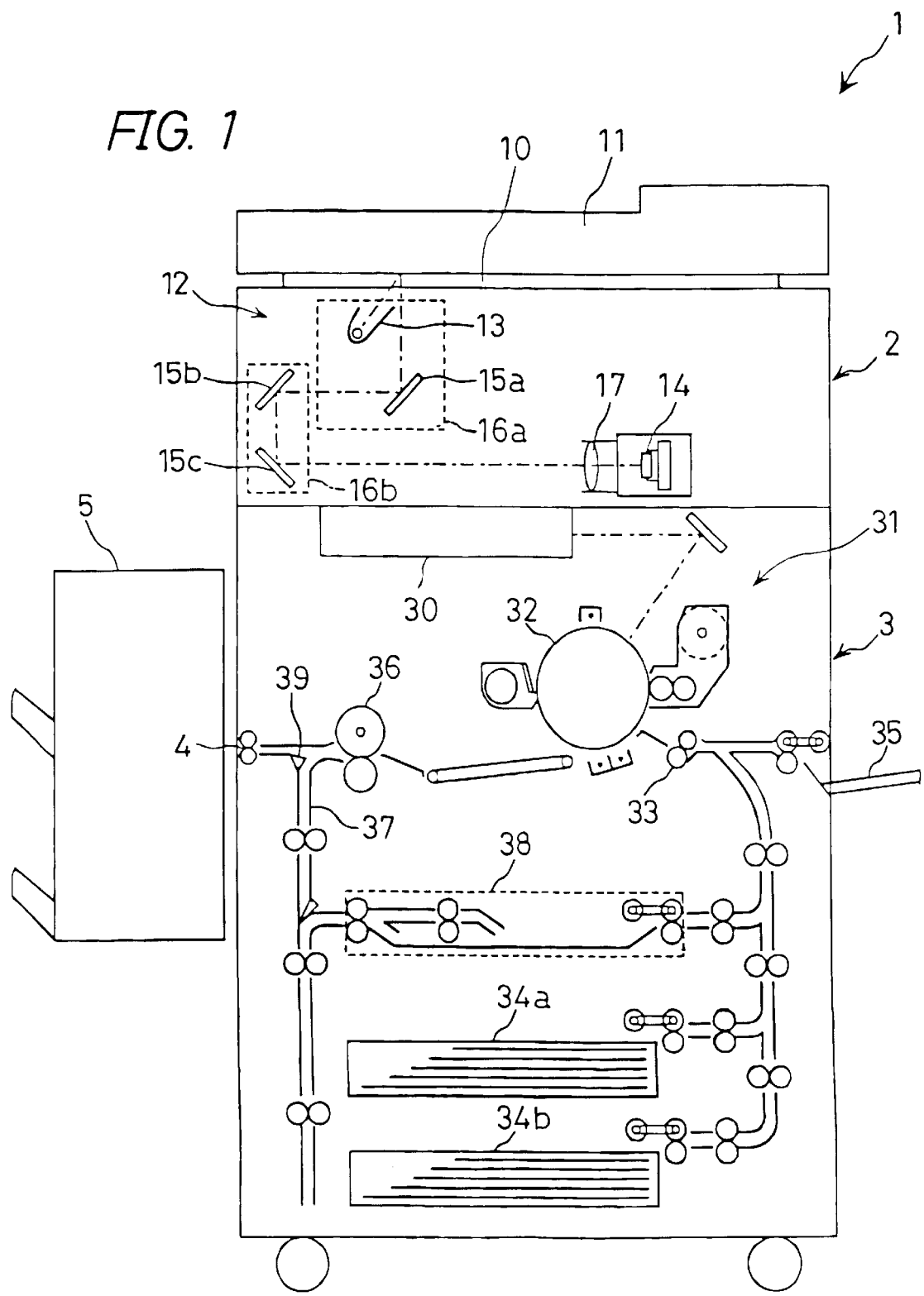

IMAGE FORMING APPARATUS AND METHOD FOR DETERMINING SUITABILITY OF REPLACEABLE COMPONENT

BACKGROUND OF THE INVENTION

1. Field of the Invention

The present invention relates to an image forming apparatus such as a copying machine, a facsimile, or a printer, and more particularly to an image forming apparatus having a scanner section for reading image information mounted in its apparatus main body and a replaceable component which is detachably attached relatively to the apparatus main body, and to a technique for determining a suitability of the replaceable component, that is, for judging whether or not the replaceable component is a genuine product.

2. Description of the Related Art

A conventionally-known electrophotographic image forming apparatus such as a copying machine, a facsimile, or a printer is typically provided with a plurality of developing devices, each of which accommodates a developer including toner of predetermined type and is arranged face to face with an image carrier, so as to visualize a latent image formed on the image carrier. In a toner supplying section of the developing device, for example, at the time of carrying out maintenance for supplying toner, a toner supplying container, namely, a replaceable component such as a toner cartridge or a toner bottle is loaded externally.

Frequently, instead of a genuine toner supplying container, a similar or forged product is inadvertently used. To prevent this, various constructions have been proposed that function to prevent inadvertent insertion of a component unsuitable for the image forming apparatus, that is, misinsertion preventive mechanisms.

Examples of such a misinsertion preventive mechanism have been disclosed in Japanese Unexamined Patent Publications JP-A 4-1682 (1992) and JP-A 4-62564 (1992). In the mechanism proposed, information reading means such as a bar code reader is disposed in a toner supplying section. The information reading means reads bar code information displayed on a toner cartridge or the like, and, based on the results of the reading operation, a misinsertion preventive shutter is driven to operate so as to prevent misinsertion.

Another proposed example of the misinsertion preventive mechanisms is as follows. When a toner supplying container having an information storage medium such as an non-volatile memory is placed in the toner supplying section, an electric circuit is formed in between the developing device and the toner supplying container. In this case, information stored in the toner supplying container is fed to the developing device or to the apparatus main body as an electric signal, and, based on the results of judgment on the information, misinsertion is prevented.

However, in the case of adopting the misinsertion preventive mechanism designed for a toner cartridge, as disclosed in JP-A 4-1682, in an image forming apparatus having a plurality of developing devices arranged face to face with an image carrier, a bar code needs to be separately provided for each toner cartridge, and also information reading means such as a bar code reader needs to be separately provided for each toner supplying section. Consequently, a larger number of constituent components are required, resulting in an increase in the cost.

Moreover, being exposedly placed in the vicinity of developer or toner, the bar code displayed on the toner cartridge is prone to contamination. Optical information reading means such as a bar code reader is also susceptible to developer or toner contamination. This inconveniently causes problems such as reading errors.

On the other hand, in the case of adopting another method in which an electric circuit is formed in between the developing device and the toner supplying container provided with an information storage medium, such as a non-volatile memory, so as to transmit and receive the information stored in the toner supplying container as electric signals, the contact points are exposed to toner or developer and are thus prone to contamination. This inconveniently causes problems such as improper contact or abrasion.

In light of the foregoing, the applicant of the present application has already proposed, in Japanese Unexamined Patent Publication JP-A 2000-187415 (2000), a construction in which a detachable unit including a toner supplying container, for use in an image forming apparatus, is designed to perform data communication with the image forming apparatus main body by means of electric waves.

According to this construction, since data transmission/reception between the toner supplying container and the apparatus main body is carried out in a non-contact state, occurrence of the aforementioned communication trouble can be prevented. In addition, improvement in design flexibility, enhancement of durability, increase in operation efficiency, space saving, and cost reduction can be achieved.

Employing the aforementioned data communication, however, poses a problem as follows. When a to-be-loaded toner supplying container has proved to be unsuitable for the image forming apparatus, it is impossible to judge whether the toner supplying container is merely a nonconforming product or a forged product fabricated in imitation of the specification of a genuine toner supplying container.

If the forged product contains toner of poor quality, the image forming apparatus, as well as its image forming process, may possibly be adversely affected. To avoid this, the reject needs to be extracted and taken out so as not to be reused. Another problem is that an additional structure is required for carrying out data communication.

SUMMARY OF THE INVENTION

The invention has been devised in view of the above-described problems with the conventional art, and accordingly an object of the invention is to provide an image forming apparatus capable of making an exact judgment on suitability of a replaceable component such as a toner supplying container with use of its existing mechanism, without additionally providing a data storage component designed for a consumable product which is detachably attached to the apparatus, or a data reading component to be placed in the image forming apparatus main body. Another object of the invention is to provide a method for determining suitability of a replaceable component.

To achieve the above objects, the invention is practiced as follows.

The invention provides an image forming apparatus comprising:

an apparatus main body including an original platform for placing thereon a target to be read out, and image reading means for reading image information on the target to be read out, to which a replaceable component is detachably attached; and control means for determining suitability of the replaceable component, the control means driving the image reading means to optically scan the replaceable component, which has been placed on the original platform prior to being loaded into the apparatus main body, to read image information, and then judging whether or not the replaceable component is suitable for the image forming apparatus based on the reading result.

Image reading means, such as a scanner section, provided in a commonly-used image forming apparatus is capable of speedily reading not only a planar configuration, but also a stereoscopic configuration of an article placed on the original platform, with high accuracy.

According to the invention, it is possible to make a highly-accurate judgment on suitability of a replaceable component which is detachably attached to the image forming apparatus main body, based on data, namely, image information read out from the replaceable component, with use of an existing mechanism originally provided in the image forming apparatus, for example image reading means, without additionally providing data reading means.

Image information belonging to the replaceable component can include data about particulars of its stereoscopic configuration complicated to an extent that would prevent copying. This makes it possible to surely protect the image forming apparatus and the genuine product, that is, the replaceable component.

In the invention, it is preferable that the replaceable component is placed in a given position on the original platform, and image information is read out by the image reading means.

According to the invention, identification of the replaceable component can be made with use of an image processing function, for performing for example a turning process for image data, that is originally provided in the image forming apparatus. Thus, the replaceable component can be placed in any given position on the original platform.

No restriction is imposed on the way for placing the replaceable component on the original platform. The replaceable component can be placed without reference to a direction in which an original is subjected to scanning. That is, in placing the replaceable component, it is not necessary to consider parallelity or orthogonality with respect to the original scanning direction. (For example, there is no need for the replaceable component to be placed with its lengthwise axis aligned with a main scanning direction or a sub scanning direction).

Therefore, it is considerably easy to carry out placement of the replaceable component on the original platform, for determination of its suitability. This helps lighten user's burden entailed by reference position alignment, setting position confirmation, and setting position misalignment, resulting in an advantage in achieving speedup and high accuracy for judgment on suitability.

In the invention, it is preferable that the replaceable component has, at least on its planar portion, one or more readout surfaces including a character or mark, and image information on the readout surface is read out by the image reading means.

According to the invention, when the replaceable component is placed on the original platform, if its surface to be brought into contact with the platform, i.e., the readout surface, is formed as a flat surface, or a plane, the replaceable component can be placed in a stable state. Consequently, reading of image data can be achieved with higher accuracy.

Even if no particular industrial design is required in the replaceable component itself, it is preferable that a trademark character or logo mark possessing unique ornamental characteristics is planarly formed in a certain region of the replaceable component considered suitable for image reading, and that the region serves as a setting surface with respect to the original platform. It is also preferable to make design registration as required. This makes difficult copy of the replaceable component or distribution of forged products, thus putting the genuine product under proper protection.

In the invention, it is preferable that the apparatus main body is provided with storage means for storing in advance image data for reference, as image information indicating visual characteristics of the replaceable component fit for the apparatus, and that the control means determines suitability of the replaceable component by comparing the image information on the visual characteristics of the replaceable component read out by the image reading means to the reference image data stored in advance in the storage means.

According to the invention, in the storage means originally provided in the image forming apparatus such as an image data ROM or a hard disk drive, the visual characteristics of the replaceable component fit for the apparatus, specifically, dimensional configuration of the product's contour; color tone; characteristic items such as a trademark; and property can be stored in advance as image data.

The aforementioned image data, defined as reference image data, is compared point-by-point or minutely with the image information data about the properties of the replaceable component read out at the time of determining suitability, at a data level. Consequently, judgment on suitability of the replaceable component can be made with high accuracy.

In the invention, it is preferable that the control means functions to suspend image forming operations during image reading and image processing required for determining suitability of the replaceable component.

According to the invention, since the final image forming operation is not performed concurrently, the burdens on the image forming apparatus can be lightened from the standpoints of both hardware and software associated with the apparatus. This makes it possible to achieve high accuracy and speedup in the judgment on suitability of the replaceable component.

In the invention, it is preferable that the replaceable component is an image forming unit.

According to the invention, the judgment on suitability of the image forming unit, which is detachably attached to the image forming apparatus main body, can be made with high accuracy only with an existing mechanism originally provided in a commonly-used image forming apparatus.

In the invention, it is preferable that the replaceable component is a toner supplying container.

According to the invention, the judgment on suitability of the toner supplying container, which is detachably attached to the image forming apparatus main body, can be made with high accuracy only with an existing mechanism originally provided in a commonly-used image forming apparatus.

In the invention, it is preferable that the replaceable component is a process cartridge.

According to the invention, the judgment on suitability of the process cartridge, which is detachably attached to the image forming apparatus main body, can be made with high accuracy only with an existing mechanism originally provided in a commonly-used image forming apparatus.

In the invention, it is preferable that the replaceable component is a development cartridge.

According to the invention, the judgment on suitability of the development cartridge, which is detachably attached to the image forming apparatus main body, can be made with high accuracy only with an existing mechanism originally provided in a commonly-used image forming apparatus.

In the invention, it is preferable that, at the instant when unsuitability is proved based on reading results, the control means functions to degrade the image forming performance.

According to the invention, for example, by degrading the quality of output images, it is possible to allow users to immediately recognize that a satisfactory image quality cannot be attained with use of a nonconforming replaceable component. Consequently, the nonconforming replaceable component is replaced with a suitable one without fail. Alternatively, significantly decreasing the paper feeding speed is also effective. Thus, it is possible to prevent occurrence of contingencies ascribable to loading of a nonconforming component.

In the invention, it is preferable that notification means is further provided that gives a warning using legends or sound output at the instant when unsuitability is proved by the control means based on reading results.

According to the invention, since a notification is made as to unsuitability of a component loaded, the nonconforming component is replaced without fail, thus preventing intrusion of nonconforming components.

In the invention, it is preferable that, at the instant when unsuitability is proved based on reading results, the control means functions to suspend image forming operations.

According to the invention, since image forming operations are suspended, the nonconforming component is replaced without fail, thus surely preventing loading of nonconforming components.

In the invention, it is preferable that the image reading means performs reading on an original placed on the original platform, or an indication image emplaced on each replaceable component which is detachably attached relatively to the apparatus main body, by means of optical scanning, and that the control means includes: an image data storage section in which first image data, obtained from an indication image emplaced on a replaceable component for the image forming apparatus, is stored in advance; conformance-degree detecting means for detecting, after comparing the first image data with second image data obtained from the indication image read out by the image reading means, conformance between the first image data and the second image data; and determining means for determining suitability of the replaceable component based on a detection result provided by the conformance-degree detecting means.

According to the invention, whether or not a replaceable component is suitable for the image forming apparatus can be judged with high accuracy by reading an indication image emplaced on the detachable replaceable component, such as a toner bottle or an ink bottle, with use of the image reading means. This helps prevent occurrence of troubles ascribable to loading of a nonconforming component.

Moreover, employed as the aforementioned image reading means is existing image reading means such as a scanner that is originally provided in an image forming apparatus. This eliminates the need to additionally provide an extra determining device such as an image sensor, whereby making it possible to avoid an increase in the cost.

Further, since suitability of the replaceable component is determined before it is loaded into the apparatus main body, an image sensor and an indication image emplaced on the replaceable component are free from contamination with toner or the like, and the indication image is prevented from being erroneously read out and recognized due to improper loading of replaceable components.

In the invention, it is preferable that the replaceable component is a printing-toner container.

According to the invention, container-specific information inherent in a container, i.e., a replaceable component such as a toner bottle which is detachably attached relatively to an apparatus main body, is read out by the image reading means originally provided in the image forming apparatus, such as a scanner. Then, the second image data, obtained from the indication image thus read out, is compared with the first image data obtained from the indication image emplaced on the container fit for the image forming apparatus. In this way, whether or not the container having the second image date is suitably used for the image forming apparatus can be detected with high accuracy.

Since suitability of the detachable container can be detected prior to its loading, it is possible to prevent the indication image information from being erroneously recognized due to troubles such as improper setting of the container or contamination of the image sensor.

Moreover, a series of the above-described operations, for example judgment on suitability of a toner bottle with respect to the apparatus main body, can be performed without departing from the ranges of operations, functions, and operation methods associated with a common image forming apparatus. This helps lighten psychological burdens on users.

In the invention, it is preferable that the indication image is composed of at least one of a character, a mark, and a bar code.

According to the invention, replaceable component-specific information including date of manufacture; type; characteristics; and properties associated to each replaceable component is represented in the form of an indication image composed of a character, a mark, or a bar code. Thus, whether or not the replaceable component is a conforming component can be judged with ease.

In the invention, it is preferable that the control means judges whether or not the replaceable component is suitably used for the apparatus based on image information on an indication image, composed of at least one of a character, a mark, and a bar code, emplaced on the replaceable component that has been read out by the image reading means.

According to the invention, the existing image reading means such as a scanner has a function of reading container information, i.e., indication image information in the form of a character, a mark, or a bar code, emplaced on an article housing used as a replaceable component. This eliminates the need to additionally provide an extra indication image reading device such as an image sensor.

Hence, in the image forming apparatus embodying the invention designed for reading container information, i.e., indication image, suitability of a replaceable component is determined based on the image information on the indication image read out by the image reading means. This makes it possible to readily determine suitability of an article housing, i.e., a replaceable component without changing hardware configurations.

Moreover, since the operations are performed at an image-processing level, conversion and turning process for image data can be readily performed by means of computing. This makes it possible to prevent misrecognition of the image information on the indication image caused by improper reading of bottle information, for example failure of bar-code reader operation due to poor skill.

A series of the above-described operations, for example judgment on suitability of a toner bottle with respect to the apparatus main body, can be performed without departing from the ranges of operations, functions, and operation methods associated with a common image forming apparatus. This helps lighten psychological burdens on users.

Moreover, performing the above-described operations does away with the need to impose particular restrictions on placement of a label or the like containing bottle information on a toner bottle, for example restrictions as to placement position and placement direction. This helps enhance the workability.

In the invention, it is preferable that display means is further provided that displays determination results provided by the determining means, based on the image information on the indication image read out by the image reading means.

According to the invention, since notification is made as to suitability of the replaceable component with respect to the image forming apparatus main body, users are notified about the use of nonconforming products. This makes it possible to prevent improper image formation caused by troubles ascribable to loading or mixture of a nonconforming component with respect to the apparatus body, that is, troubles ascribable to the use of toner of poor quality.

In the invention, it is preferable that, at the instant when unsuitability is proved based on the determination result provided by the determining means, the control means functions to suspend the operation of the image forming apparatus.

According to the invention, when the container (replaceable component) is judged to be a nonconforming product, the operation of the image forming apparatus is suspended. This makes it possible to completely prevent improper image formation caused by troubles ascribable to loading or mixture of a nonconforming component with respect to the apparatus body, that is, troubles ascribable to the use of toner of poor quality.

In the invention, it is preferable that, at the instant when unsuitability is proved by the determining means, the control means functions to change the operation mode or various image-formation parameters of the image forming apparatus in such a way that the image forming performance is degraded.

According to the invention, in the above case, since desired image quality cannot be attained, users are surely notified that there exists a nonconforming product. This makes it possible surely prevent improper image formation caused by troubles ascribable to loading or mixture of a nonconforming component with respect to the apparatus body, that is, troubles ascribable to the use of toner of poor quality.

The invention further provides a method for determining suitability of a replaceable component, comprising the steps of:

placing a replaceable component on an original platform of an image forming apparatus prior to its loading into an apparatus main body of the image forming apparatus;

reading image information by optically scanning a specific part of the replaceable component with use of image reading means;

comparing the reading result with previously-stored image data about a conforming product; and judging whether or not the replaceable component is suitable for the image forming apparatus.

Image reading means such as a scanner provided in a commonly-used image forming apparatus is capable of speedily reading not only a planar configuration, but also a stereoscopic configuration of an article placed on the original platform, with high accuracy.

According to this method, firstly, the image data about a specific part of the replaceable component placed on the original platform, i.e., the data about the readout surface, the indication image, or the like are read out by the image reading means originally provided in the image forming apparatus. Thereafter, the reading result is compared with the previously-stored image data about a conforming product, i.e., reference image data. With such process steps, suitability of a replaceable component can be determined with high accuracy.

Since the image reading means, such as a scanner, of the image forming apparatus has high reading capability, image information belonging to a specific part of the replaceable component can include data about particulars of its stereoscopic configuration complicated to an extent that would prevent copying. This makes it possible to surely protect the image forming apparatus and the genuine product, i.e., the replaceable component.

BRIEF DESCRIPTION OF THE DRAWINGS

Other and further objects, features, and advantages of the invention will be more explicit from the following detailed description taken with reference to the drawings wherein:

FIG. 1 is an explanatory sectional view showing a structure of an image forming apparatus according to one embodiment of the invention;

DETAILED DESCRIPTION OF THE PREFERRED EMBODIMENTS

Figure 1A:
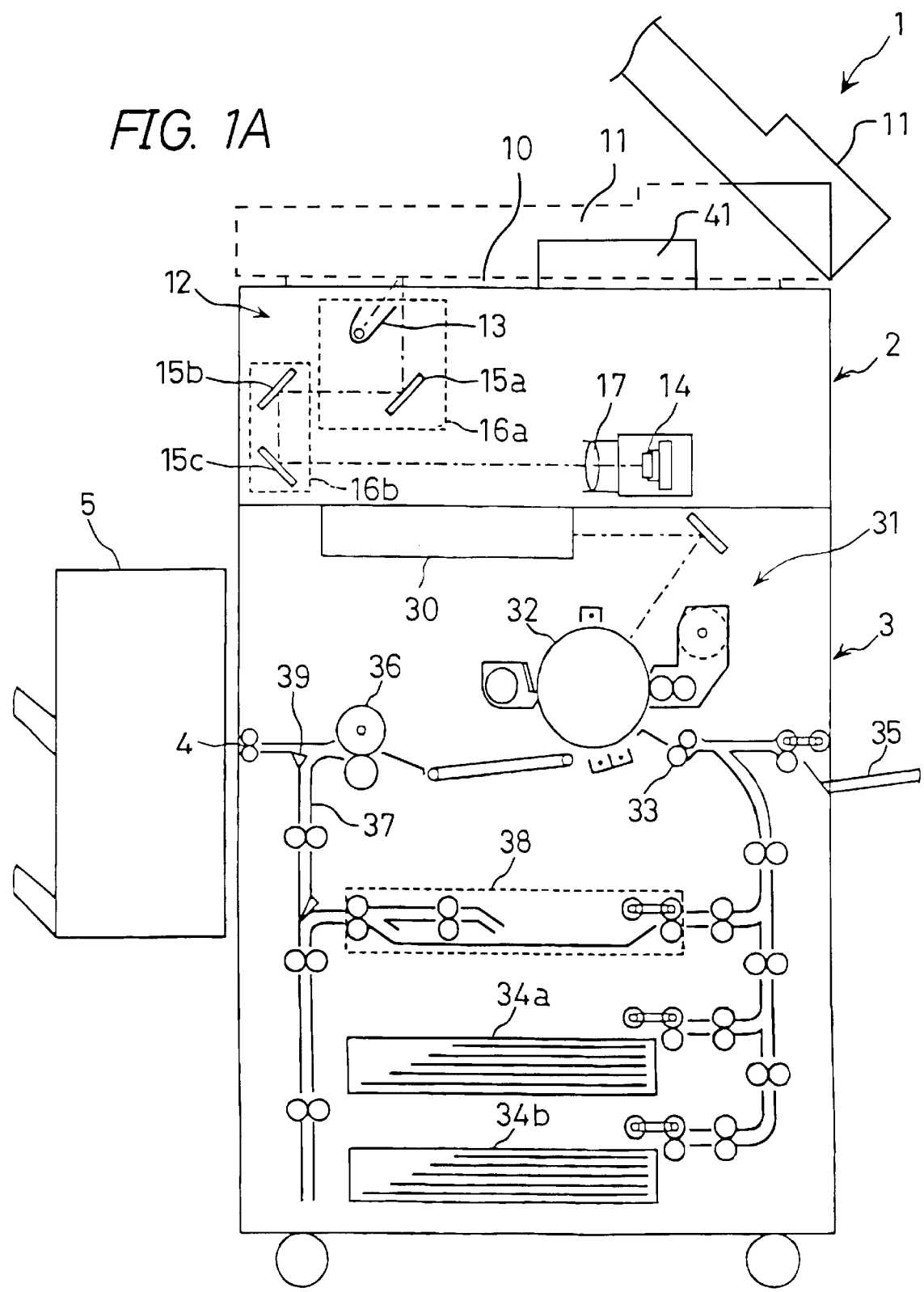
FIG. 1A is an explanatory sectional view of the image forming apparatus of FIG. 1 showing placement of a replaceable component on a platform of the apparatus.

Now referring to the drawings, preferred embodiments of the invention are described below.

With reference to the accompanying drawings, a description will be given below as to an image forming apparatus and a method for determining suitability of a replaceable component according to an embodiment of the invention.

FIG. 1 is a sectional view showing an internal structure of a digital copier 1 built as an image forming apparatus. As shown in the figure, the digital copier 1 is mainly composed of a scanner section 2, as image reading means, and a laser printer section 3, and also includes, as shown in the control-system block diagram of FIG. 2, a control section 43 acting as control means; an image processing section 44; an operation section 42; a display section 40; etc.

The scanner section 2 is composed of: an original platform 10 made of transparent glass; a duplex copying-capable automatic original feeding device (ADP) 11 for automatically supplying and transporting an original to the original platform 10; and an original image reading unit, i.e., a scanner unit 12 for scanning and reading an image of an original placed on the original platform 10.

Readout image data about an original read out by the scanner section 2 is fed, via the control section 43, to the image processing section 44, as copy data that can be subjected to a recording process in the printer section 3. Then, a predetermined image processing operation is performed on the image data.

The ADP 11 is operated as follows. A plurality of originals are set on an incorporated original tray (not shown) at one time. The originals set thereon are automatically fed to the original platform 10, located above the scanner unit 12, one by one. In order for either a single side or both sides of an original to be read out by the scanner unit 12 at user's request, the ADP 11 is provided with a single-sided original conveying path, a double-sided original conveying path, conveying path switching means, etc.

The scanner unit 12 is composed of: a first scanning unit 16a; a second scanning unit 16b; an optical lens body 17; and a CCD element 14. The first scanning unit 16a has mounted therein a lamp reflector assembly 13 and a first reflecting mirror 15a. The lamp reflector assembly 13 is built as a scanning light source for exposing a surface of an original to light. The first reflecting mirror 15a reflects light reflected from an original, so as for an image of light reflected from an original to be directed to the CCD element 14. The second scanning unit 16b has mounted therein a second and a third reflecting mirror 15b and 15c for directing an image of light reflected from the first reflecting mirror 15a to the CCD element 14. The optical lens body 17 focuses a reflected light image, which has been directed to the optical lens body 17 through the reflecting mirrors 15a, 15b, and 15c from an original, onto the CCD element 14. The CCD element 14 converts an image of light reflected from an original into an electric image signal.

The scanner section 2 is designed to operate as follows. By operating the ADP 11 and the scanner unit 12 in a relative manner, to-be-read originals are placed on the original platform 10 one after another, and simultaneously the scanner unit 12 is moved along the under surface of the original platform 10, whereupon an original image is read out. In particular, where the first scanning unit 16a is moved from left to right, along the original platform 10, at a constant speed V, the second scanning unit 16b is controlled to move parallely in the same direction at a speed V/2 with respect to the speed V. In this way, the image of the placed original is formed onto the CCD element 14 line by line, whereupon the image reading is completed.

The image data, obtained by reading the original image with use of the scanner unit 12, is fed, via the control section 43, to the image processing section 44. Then, after being subjected to necessary operations, the image data is stored once in a memory of the control section 43, for example an image data RAM (Random Access Memory) 45, as copy data that can be used in the printer section 3 without being processed. The copy image data stored in the memory is fed to the laser printer section 3 in accordance with output instructions. Whereupon, in the laser printer section 3, the image is recorded on a non-illustrated sheet used as a print-recording medium.

The laser printer section 3 is composed of a conveyance system for conveying a paper sheet on which an image is formed, a laser writing unit 30, and an electrophotographic processing section 31 for forming an image.

The laser writing unit 30 is provided with a semiconductor laser, a polygon mirror, an f-θ lens, etc. The semiconductor laser emits laser light in accordance with the copy data read out from the memory after reading is performed by the scanner unit 12, or in accordance with external data transferred from an external apparatus. The polygon mirror deflects laser light at uniform angular speed. The f-θ lens corrects the laser light having been deflected at uniform angular speed in such a way that the laser light is deflected, at uniform speed, on a photoconductive drum constituting the electrophotographic processing section 31. In the electrophotographic processing section 31, a known photoconductive drum 32 is arranged, and, around the photoconductive drum 32 are disposed a charging device, a developing device, a transfer device, a peeling device, a cleaning device, and a charge removing device.

On the other hand, the sheet conveyance system is composed of: a conveying section 33 for conveying a sheet to a transfer position at which the transfer device, in particular, of the electrophotographic processing section 31 is arranged; cassette feeding devices 34a and 34b for feeding sheets to the conveying section 33, or a manual feeding device 35 for feeding an adequate amount of sheets of required size; a fixing device 36 for fixing an image, in particular a toner image, formed on a sheet having undergone a transfer process; a switch-back conveying path 37 for turning a sheet upside down to form an image once again on a back surface of the sheet having undergone fixing, that is, to form images on both sides of the sheet; and an intermediate tray 38 for receiving sheets passing through the switch-back conveying path 37.

Arranged on the downstream side of the fixing device 36 is a switching pawl 39 for allowing switching to the switch-back conveying path 37. The switching pawl 39 performs switching between the path through which a sheet having undergone image formation is directed, via a discharge section 4, to a sheet post-processing device 5, and the switch-back conveying path 37.

The sheet conveyance system, in particular the cassette feeding device 34a, 34b, accommodates sheets of user-selected size. Moreover, a small number of sheets of different user-selected size are supplied to the manual feeding device 35. Since users are able to select either the sheets accommodated in the feeding cassette or those placed on the manual feeding device 35, feeding of sheets of desired size can be achieved by users.

In the above-described configuration of the printer section 3, image formation is performed in accordance with the following procedure.

Copy data or external data is stored in a bit-data state in an image memory of the control section 43. Therefore, the data can be used in the printer section 3 without being processed. By performing laser scanning with the use of the laser writing unit 30 in accordance with output instructions, the image data is formed on the surface of the photoconductive drum 32 as an electrostatic latent image, and is then visualized by toner.

With respect to the toner image formed on the surface of the photoconductive drum 32, a sheet of selected size placed either in the feeding device 34 or the manual feeding device 35 is fed, via the conveying section 33, to the transfer device. Thereupon, the toner image on the surface of the photoconductive drum 32 is transferred to the surface of the sheet, and is then fixed on the sheet by the fixing device 36. Upon completion of the image formation, the sheet is conveyed, via the discharge section 4, to the sheet discharge-processing device 5.

Next, with reference to the block diagrams shown in FIGS. 2 and 3 and a flow chart shown in FIG. 4, a description will be given below as to a sequence of a procedure for determining suitability of a replaceable component 41.

Figure 2:
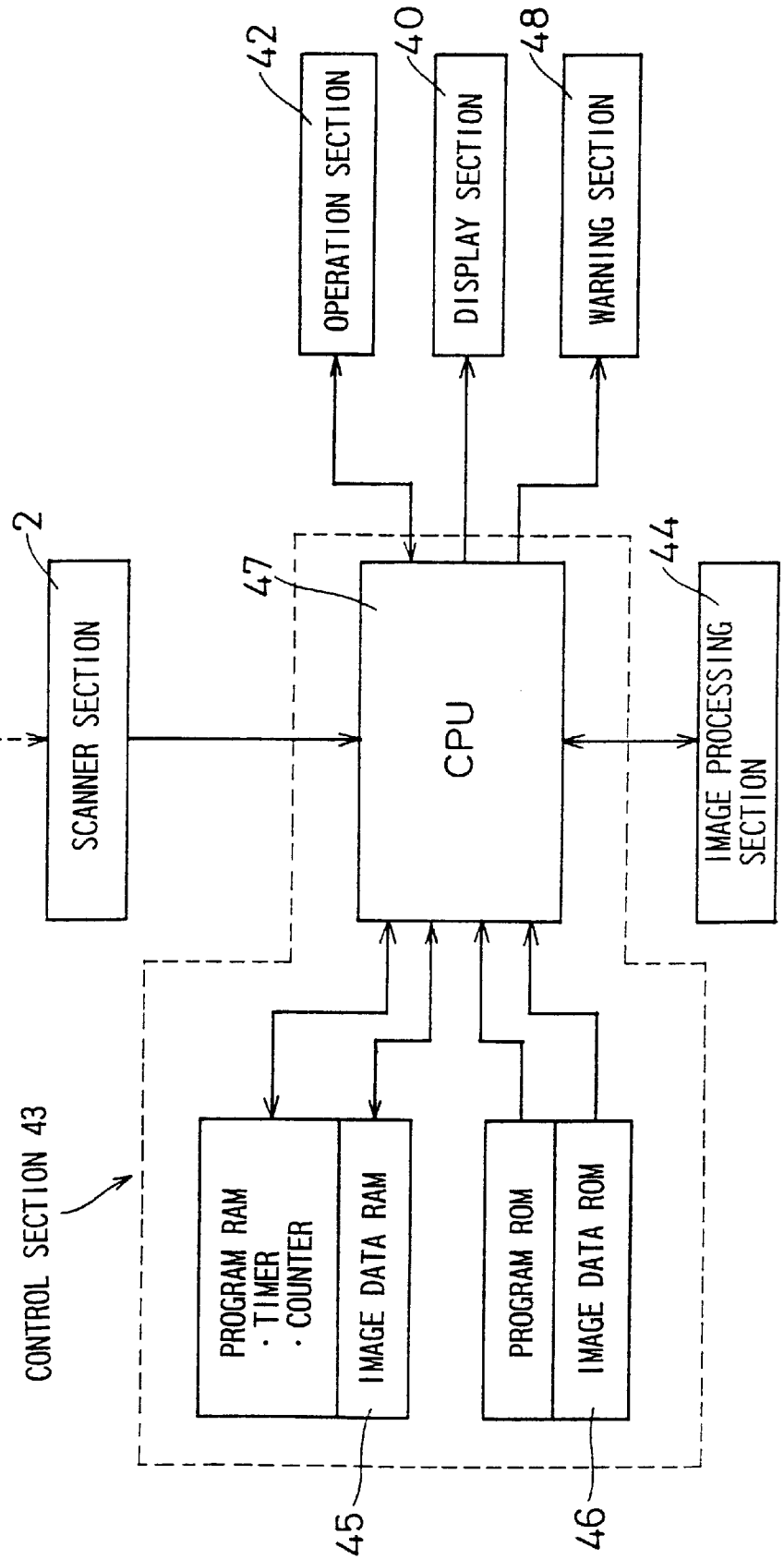
FIG. 2 is a block diagram showing an electrical configuration of a control system incorporated in the image forming apparatus of the embodiment of the invention.
Figure 3:
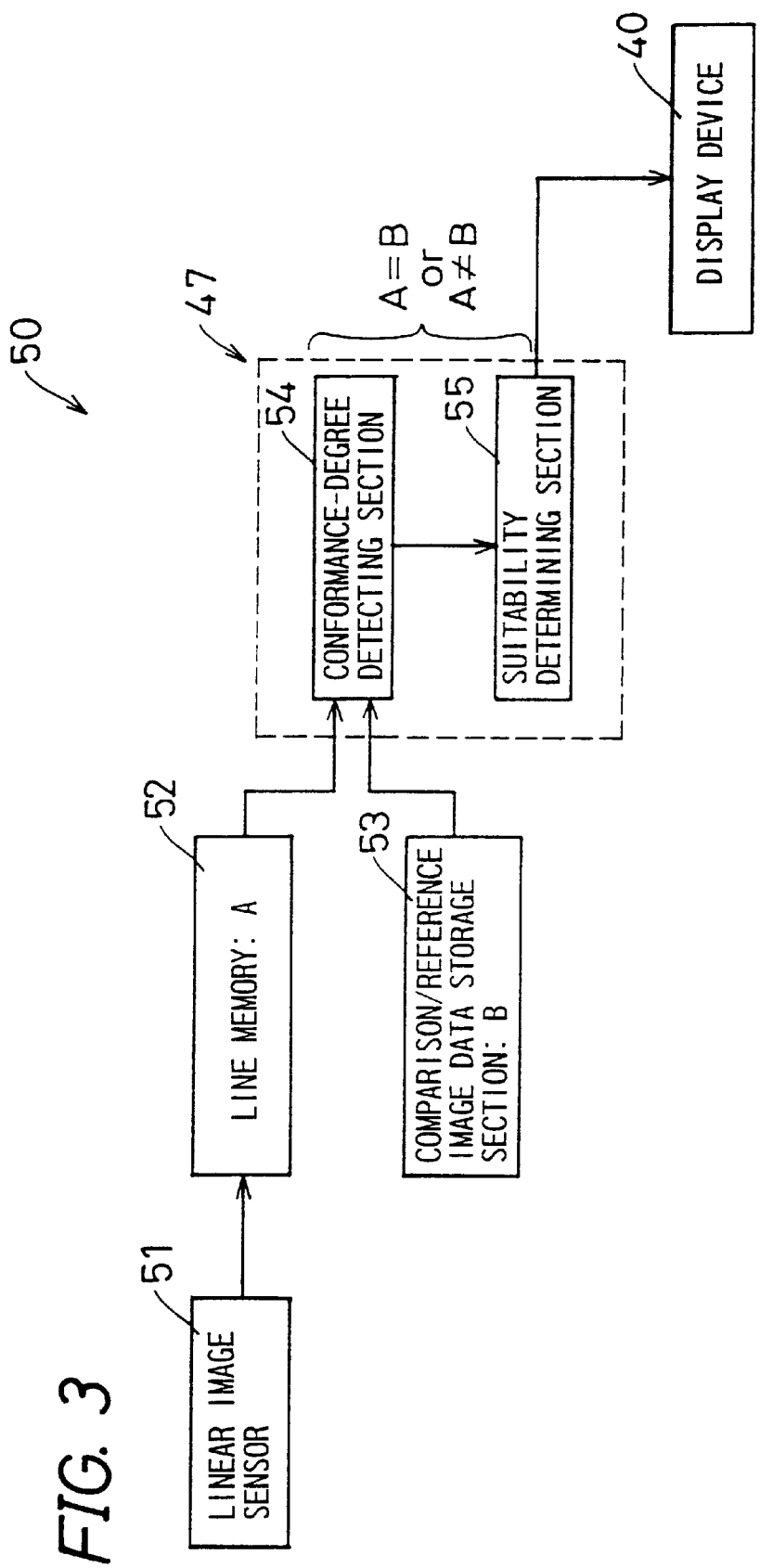
FIG. 3 is a block diagram showing an electrical configuration of a control system of a suitability detecting section.

At first, in a step S1, at the time of turning on the power to the digital copier 1, an instruction to replace the replaceable component 41 is issued from the copier 1 via the display section 40 shown in FIG. 2. The replaceable component 41, which is detachably attached to the copier 1, should potentially be replaced in the event of exhaustion and depletion. The examples of the replaceable component 41 include: an image forming unit; a toner supply container; a process cartridge; a development cartridge; and other supply products.

However, among those replaceable components 41, in many cases, while some are conforming products that are designed for use in the digital copier 1 and deliver performance capability excellent enough to obtain a satisfactory image, others are nonconforming products that not only fail to bring the capability inherent in the apparatus into full play, but also may possibly cause malfunction or breakdown of the apparatus. In light of this, it is preferable that users are able to identify a nonconforming product on their own and reject it prior to loading in the apparatus. However, it is not easy for users to readily and speedily distinguish whether the replaceable component is a conforming product or a nonconforming product with high accuracy.

As described earlier, in the method practiced conventionally, various replaceable component-specific information is transmitted to the apparatus in which the replaceable component is loaded, so that the apparatus determines suitability of the replaceable component. In this case, however, the replaceable component needs to have an extra element such as a bar code label or a memory device for storing information. Thus, a larger number of constituent components are required, resulting in an increase in the cost.

Moreover, it is necessary to add optical reading means such as a bar code reader, or memory reading means to the apparatus main body. This leads to an increase in the cost. Such information reading means, being typically disposed inside the apparatus, is prone to malfunction due to degradation in performance resulting from toner contamination, that is, degradation in optical performance, improper contact between electric circuits, or heat generation.

In view of the foregoing, in this embodiment, determination of suitability of the replaceable component 41 is carried out in a manner as set forth hereunder.

In step 2, in response to an instruction provided by the display section 40, the user places for example the replaceable component 41 to be loaded in the digital copier 1 on the original platform 10 in a stable state (see FIG. 1A). Since identification of the replaceable component 41 is made with use of an image processing function, for performing for example a turning process for image data, that is originally provided in the image forming apparatus, the replaceable component 41 can be placed in any given position on the original platform 10.

Moreover, there is no operational restriction as to a manner for placement of the replaceable component 41. Placement of the replaceable component 41 can be made without reference to parallelity and orthogonality with respect to the original scanning direction. Specifically, for example, there is no need for the replaceable component 41 to be placed with its lengthwise axis aligned with a main scanning direction or sub scanning direction. Consequently, not only it is possible to enhance the workability in determination of suitability of the replaceable component 41, but it is also possible to lighten user's burden entailed by reference position alignment, setting position confirmation, and reprocessing for coping with setting position misalignment.

Then, in step 3, by operating the operation section 42, the scanner section 2 is driven to optically scan the replaceable component 41. The resultant image information is taken in the apparatus, and the readout image data is fed from the scanner section 2, via the control section 43, to the image processing section 44. The image data is, after being subjected to image processing in the image processing section 44 as required, stored in the storage means, for example, an image data RAM 45.

In this case, to-be-captured image data can be obtained from either one specific region or a plurality of regions of the replaceable component 41. To obtain image data from a plurality of regions, the posture of the replaceable component 41 needs to be changed several times. For example, in the box-shaped replaceable component 41, image data can be obtained from six regions at the maximum. On the other hand, in the replaceable component 41 having the shape of a cylinder or a polygonal column, image data can be obtained from a plurality of regions: two side surface and the other body surfaces.

Note that, if the replaceable component 41 has a complicated contour, image data is obtained only from its surfaces that can be put into position stably. In either case, in order for the replaceable component 41 to be set in a stable state, and to perform reading of image data with accuracy, it is preferable that a large-area plane is selected as the readout region.

At this stage, only the reading of image information of an object is carried out, and thus no image forming operation is executed. Since the final image forming operation is not performed concurrently, the burdens on the image forming apparatus can be lightened from the standpoints of both hardware and software associated with the apparatus. This makes it possible to achieve high accuracy and speedup in determination of suitability of the replaceable component, namely, suitability determination.

On the other hand, in the storage means provided in the image forming apparatus, such as the image data ROM (Read Only Memory) 46 or a hard disk, the visual characteristics of the replaceable component fit for the apparatus, specifically, dimensional configuration of the component's contour; color tone; characteristic properties and items such as a trademark (presence of logo, logo shape (font), or logo size) can be stored in advance as image data. If a conforming product undergoes new improvements and consequently some changes are required, such data about the replaceable component can be replaced with another by a serviceman.

In this respect, although no particular industrial design is required in the replaceable component, i.e. supply product itself, it is possible to make design registration of the supply product. In the construction according to the invention, a nonconforming product cannot be judged to be a conforming product, by the image data-based judgment described below, without being fabricated in imitation of a conforming product. With this in view, if design registration is made for the conforming product, imitation of the conforming product becomes difficult.

Moreover, it is desirable that a trademark or logo mark indicating product's name or manufacturer's name is defined as a readout portion used for image judgment. In this case, fabrication of a copycat product is impossible without forgery of a trademark or logo mark of a conforming product. If a false indication of manufacturer's name or product's name comes to light, the forged product is no longer allowed to come on the marketplace. For example, even if the forged product is given characters such as "for use in XX from A Corp." or "FOR A Corp. XX" to pretend to be an equivalent to an A Corp. product at the risk of causing mix-up of components of different origins, the product is rejected at the checking stage without fail.

Next, in step S4, under the control of the CPU 47, the image data about the conforming product, stored in the image data ROM 46, and the image data about the replaceable component 41 placed on the original platform 10, stored in the image data RAM 45, are called up, and then the two images are compared with each other. This allows the user to judge whether the about-to-be-loaded replaceable component 41 is a conforming product or a nonconforming product with high accuracy.

In the storage means, such as an image data ROM or a hard disk drive, originally provided in the image forming apparatus main body for image formation, the visual characteristics of the replaceable component fit for the apparatus, specifically, dimensional configuration of the product's contour; color tone; and characteristic items such as a trademark or a logo mark are stored in advance as image data. The image data is defined as reference image data, namely, reference data. The reference data is compared point-by-point or minutely with the image information data about the properties of the replaceable component read out at the time of determining suitability, namely, the sample data, at a data level.

Subsequently, in step S5, the result of the comparison of two images is checked in the CPU 47. With reference to FIG. 3, a detailed description will be given below as to a process for determining suitability of the replaceable component performed in the CPU 47.

Detection of suitability is performed in a suitability detecting section 50, which constitutes part of the control section 43 and acts as determining means. The suitability detecting section 50 is composed of: a line memory 52; a comparison/reference image data storage section 53 acting as an image data storage section; a conformance-degree detecting section 54; and a suitability determining section 55. The line memory 52, realized by the image data RAM 45, stores image data read out by a linear image sensor 51, typified by the CCD element 14, of the scanner section 2. The comparison/reference image data storage section 53, realized by the image data ROM 46 or the like, stores data about a comparison/reference image, which has previously been determined in accordance with the replaceable component, in a 2-value bit data. The conformance-degree detecting section 54 detects, after comparing the image data about the replaceable component read out by the image sensor with the comparison/reference image data stored in the comparison/reference image data storage section 53, conformance between the two image data. The suitability determining section 55 determines suitability of the replaceable component with respect to the image forming apparatus, based on a detection result provided by the conformance-degree detecting section 54 acting as conformance-degree detecting means. The suitability determining section 55 outputs the determination result to the display device 40, such as an LCD, disposed in the operation panel of the image forming apparatus.

Briefly speaking, the image data about the replaceable component, previously stored in the comparison/reference image data storage section 53, namely, the image data ROM 46, is assumed to be "A", whereas the image data about the replaceable component targeted for suitability determination at present, read out by the scanner section and stored in the line memory 52, namely, the image data RAM 45, is assumed to be "B". In this case, in the conformance-degree detecting section 54 and the suitability determining section 55, judgment is made as to whether the relationship between the two image data is given as "A"="B", or "A"≠"B" by making comparison and reference.

Note that, in reality, comparison between the image data read out by the linear image sensor 51 and the comparison/reference image data is made point-by-point, on a dot-by-dot basis, in accordance with the reading dot pitch, i.e., resolution offered by the linear image sensor 51.

When the replaceable component 41 is judged to be a conforming product, that is, when the judgment result is "A"="B", in response to instructions provided by the display section 40, etc., the user loads the replaceable component 41. Thereafter, in performing image formation, in step S6, normal surface potential and development bias are applied so that normal image processing is carried out. Then, in step S7, a satisfactory image is outputted.

In contrast, when the replaceable component 41 is judged to be a nonconforming product, that is, when the judgment result is "A"≠"B", even if the user loads the replaceable component 41, in the subsequent image formation, the surface potential and development bias are changed in step S8, and thereby the image reading status is changed intentionally. Consequently, for example, in step S9, an unusable image of poor quality is outputted. Instead of degradation of image quality, significantly decreasing the paper conveyance speed is also effective.

Figure 4:
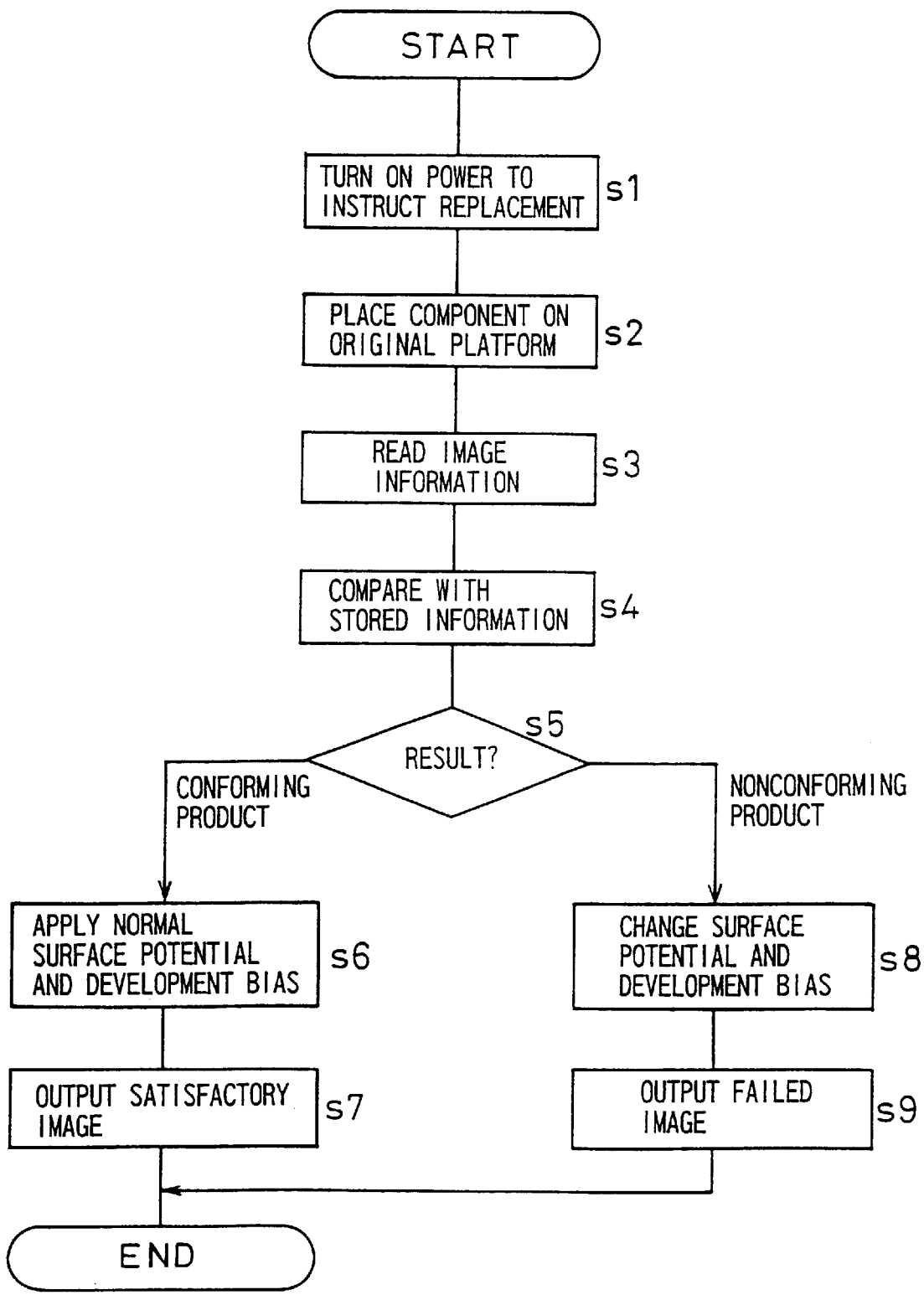
FIG. 4 is an explanatory flow chart showing a sequence of a suitability determination process.
Figure 5:
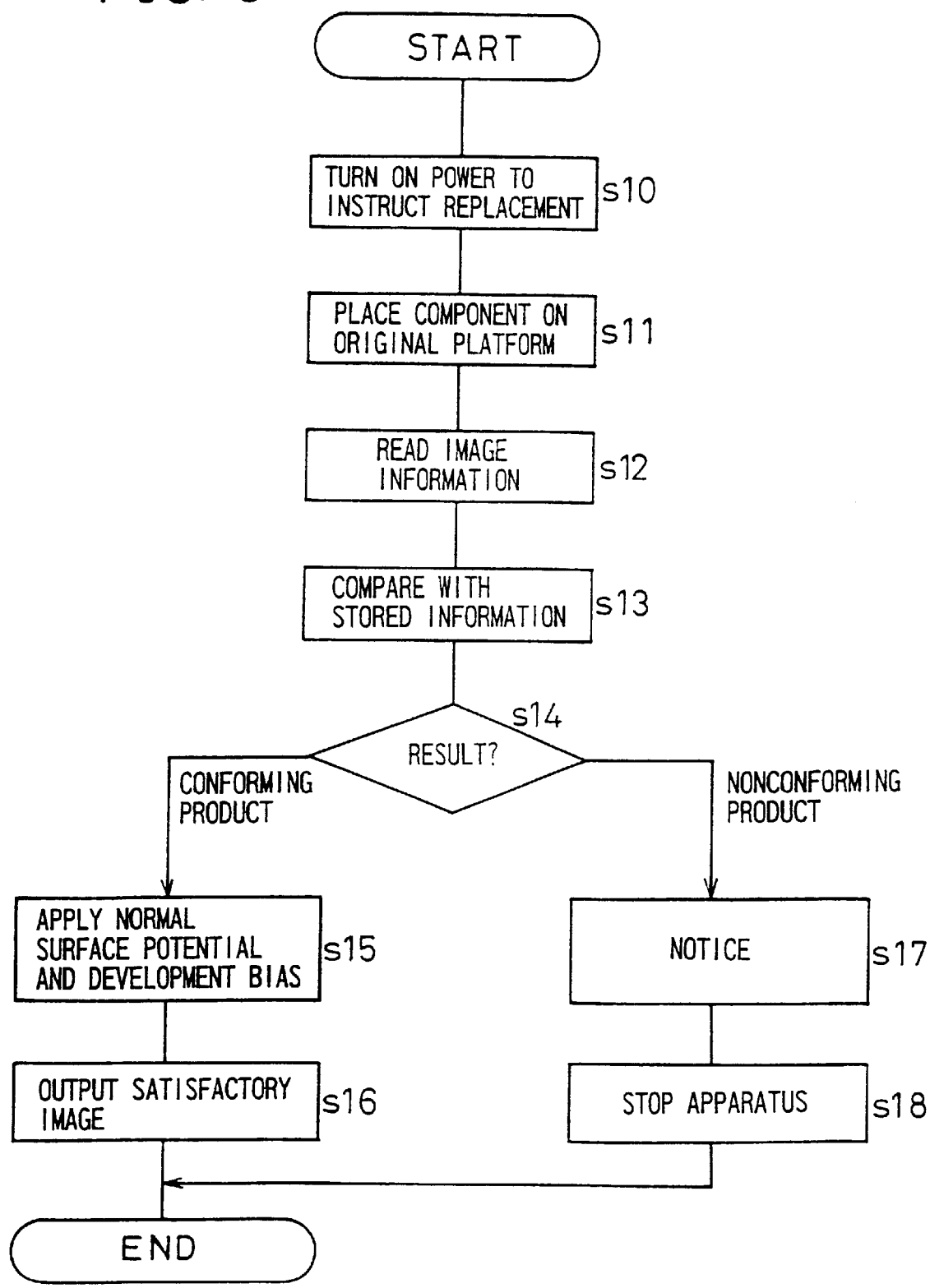
FIG. 5 is an explanatory flow chart showing another example of the sequence of the suitability determination process.

FIG. 5 shows another example of the sequence of the suitability determination process. In steps S10 through S14, alike to steps S1 through S5 of FIG. 4, when the replaceable component 41 is judged to be a nonconforming product, in step S17 shown in FIG. 5, a warning section 48 shown in FIG. 2, acting as notification means, gives a warning using at least one of legends and sound output. Whereupon, in step S18, the digital copier 1 is brought to a halt. In contrast, when the replaceable component 41 is judged to be a conforming product, in steps S15 and S16, the same procedure as in step S6 and S7 shown in FIG. 4 is performed.

As described hereinabove, according to the invention, suitability of the replaceable component 41 is determined only with an existing mechanism originally provided in the image forming apparatus. This eliminates the need to add an information storage element, such as a bar code label or a memory chip, to the replaceable component 41.

Moreover, there is no need to provide an information reading element in the apparatus. In a common image forming apparatus, the scanner section is disposed not inside the apparatus but on the top surface of the apparatus main body. Hence, it never occurs that the scanner section suffers from degradation in optical performance or malfunction caused by toner contamination.

In addition, user-friendliness can be achieved. The user is able to identify the replaceable component easily and speedily, with high accuracy, without considerably departing from the bounds of normal operations, that is, without being vexed by particular operations or psychological burdens. Thus, the image forming apparatus main body, as well as the genuine replaceable component, can be protected perfectly.

Figure 6A:
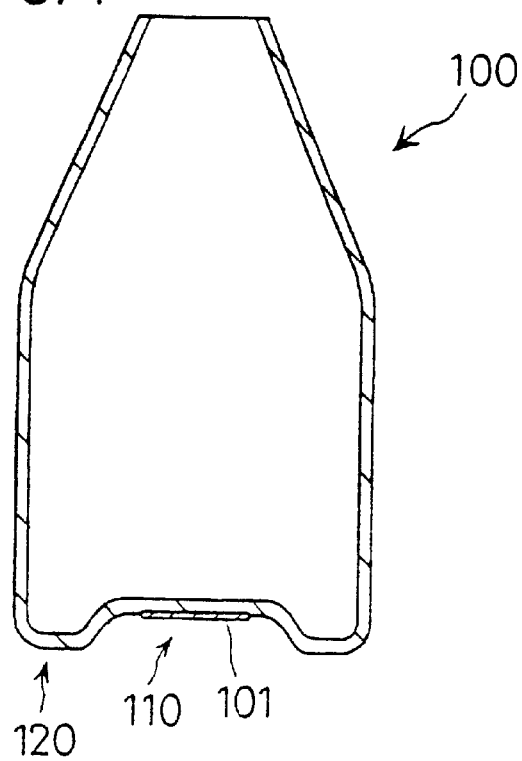
FIGS. 6A and 6B are explanatory views showing a structure of a replaceable component having formed thereon a readout surface.

Regarding the readout placement surface for representing visual characteristics required to identify a replaceable component, in a case where the replaceable component 41, typified by a development cartridge, a toner bottle, or an ink bottle, is round-shaped like a bottle, for example, as shown in FIG. 6A, the replaceable component, here, a toner bottle 100 may have, on its bottom concavity 110, a sign 101 such as a diamond pattern; a watermark; a gradation pattern; a character; or a mark, or a bar code label.

Such a toner bottle 100 is placed, at its bottom portion 110, in any given position on the original platform, so that its image information is obtained as image data with stability. In general, even if an article is placed at a distance of ca. 20 mm from the surface of the original platform, its image information such as a mark or a bar code can be read out as image data, and therefore identification of products can be carried out properly. In a case where a bar code label is stacked on such a bottom portion, a convexity 120 surrounding the bottom concavity 110 should preferably be designed to have an inner diameter smaller than a width of a common bar code reader. By so doing, the bar code label cannot be read out by the bar code reader any longer.

Figure 6B:
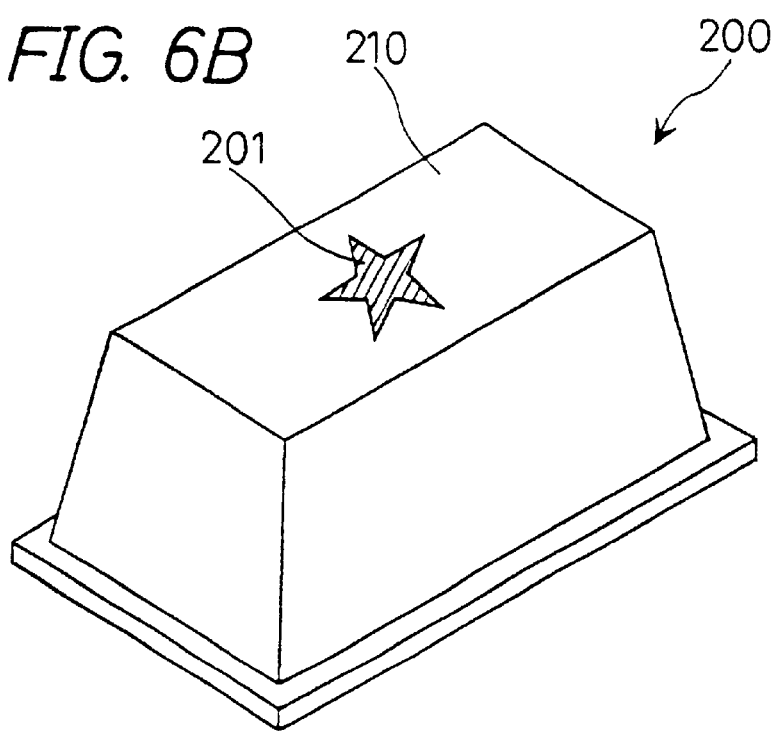

On the other hand, in a case where the replaceable component, typified by a toner cartridge, is box-shaped, for example, as shown in FIG. 6B, the replaceable component, here, a toner bottle 200 may have, on its flat bottom 210, a sign 201 such as a star- or flower-shaped figure; a diamond pattern; a watermark; a gradation pattern; a character; or a mark. The bottom 210 having such a sign acts as a readout surface. In this case, by placing the bottom 210 in a given position on the original platform, image data can be obtained with high accuracy. Note that, although not illustrated, such a readout surface having a pattern, etc. can also be provided in a plurality of regions of the replaceable component.

Further, although not illustrated, a characteristic pattern to be formed on the readout placement surface is not limited to a two-dimensional figure. For example, the aforementioned diamond pattern, etc. may be given a flectional, complicated three-dimensional shape so as to make illicit copy difficult, and to enhance the ornamental characteristics. This is because a common image forming apparatus is capable of reading stereoscopic image information with high accuracy.

The ornamental characteristics can further be enhanced by subjecting the readout placement surface to coloring. In this case, even if the image forming apparatus is designed for monochrome-image formation, by providing a color-image processing function in its image processing section, such a colored readout placement surface is acceptable in the image forming apparatus. Consequently, color-image information can be read out from the colored readout placement surface, whereby making it possible to achieve identification of a replaceable component with high accuracy.

As described hereinabove, although no particular industrial design is required in the replaceable component itself, it is possible to make design registration of the replaceable component by imparting ornamental characteristics to the replaceable component, more specifically, by providing a visually characteristic readout surface in a specific part of the replaceable component that is suitably used for reading. This, as described previously, makes difficult copy of the replaceable component or distribution of forged products, thus putting the genuine product under protection in a more effective way. Besides, the image forming apparatus as a whole can be protected.

Figure 7A:
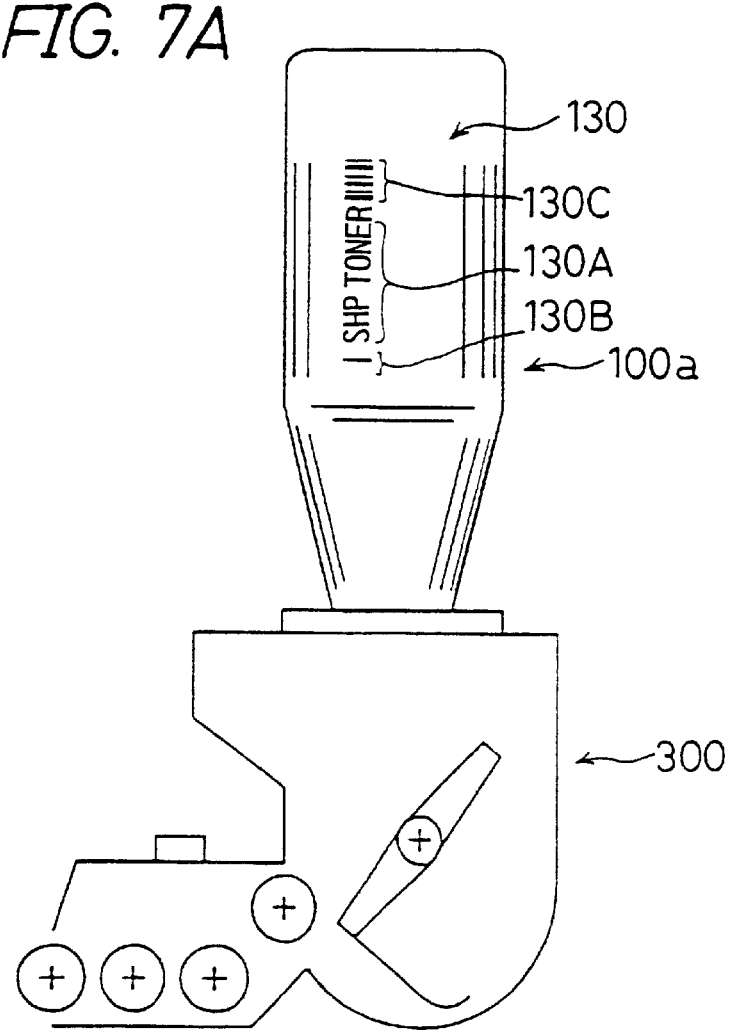
FIGS. 7A and 7B are explanatory views showing the structure of the replaceable component having an indication image formed in its peripheral part.
Figure 7B:
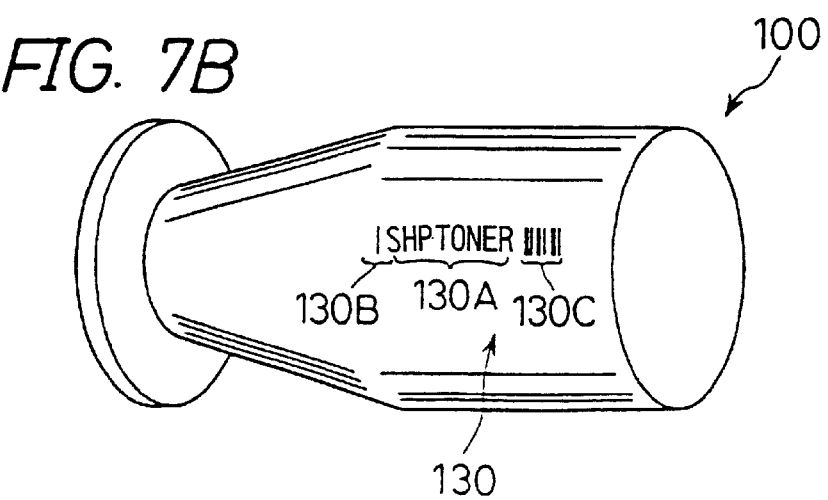

As another example of the replaceable component 41, a toner bottle 100a is shown in FIGS. 7A and 7B. In this example, an outer peripheral surface 130 of the toner bottle 100a is defined as a specific part. On the outer peripheral surface 130 are orderly arranged: an indication image 130A composed of a character or a mark, for use in detection of placement position; a reference position line 130B for reading the indication image 130A; and a bottle information image 130C composed of a bar code, a character, or a mark, for representing the toner bottle 100a-specific information including the type of toner contained in the toner bottle 100a, namely, color, model, and date of manufacture of the toner. Judgment on whether or not the toner bottle 100a is a conforming product is made by reading these indication images with use of the scanner section 2.

By utilizing the above-described indication images, composed of a character, a mark, and a bar code, that represent the toner bottle 100a-specific information including date of manufacture; type; characteristics; and properties, whether or not the toner bottle 100a is a conforming product can be judged readily. Note that FIG. 7A shows a state in which the toner bottle 100a is loaded in a developing device 300 to supply toner.

Figure 8A:
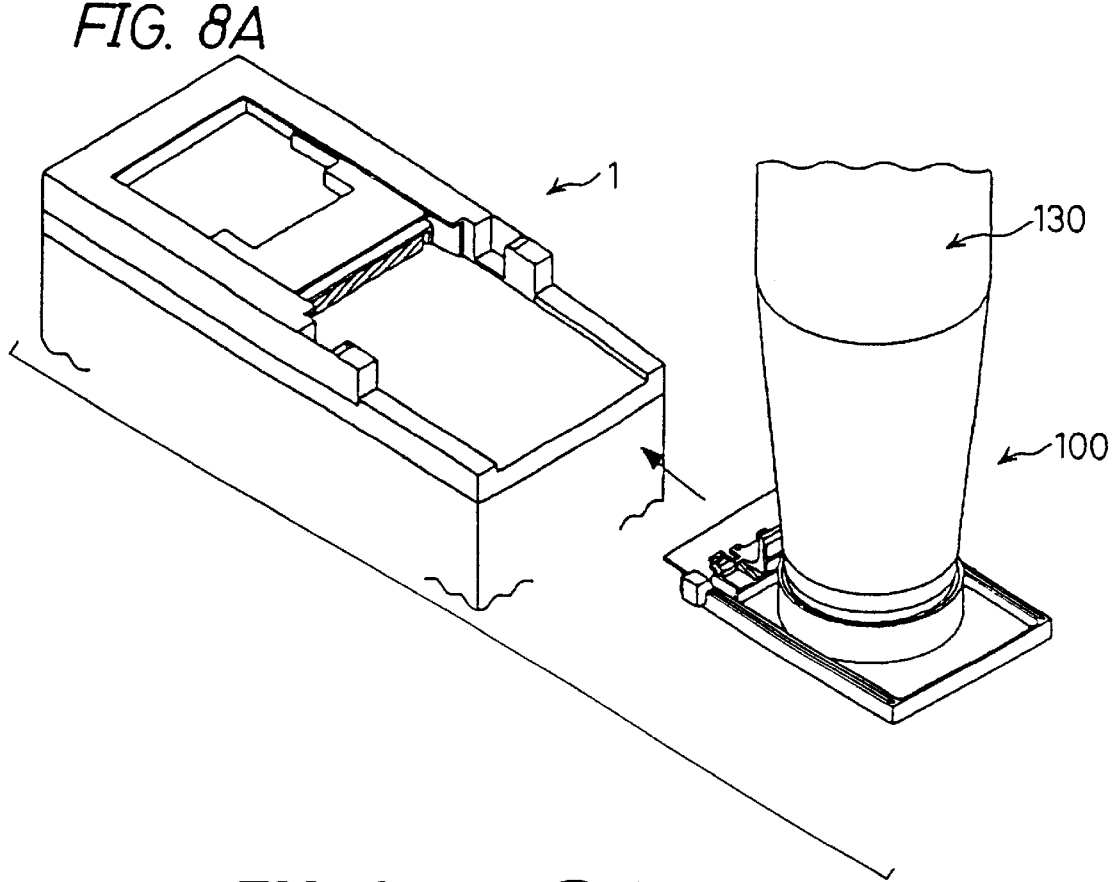
FIGS. 8A and 8B are explanatory views showing how to load the replaceable component in the image forming apparatus.
Figure 8B:
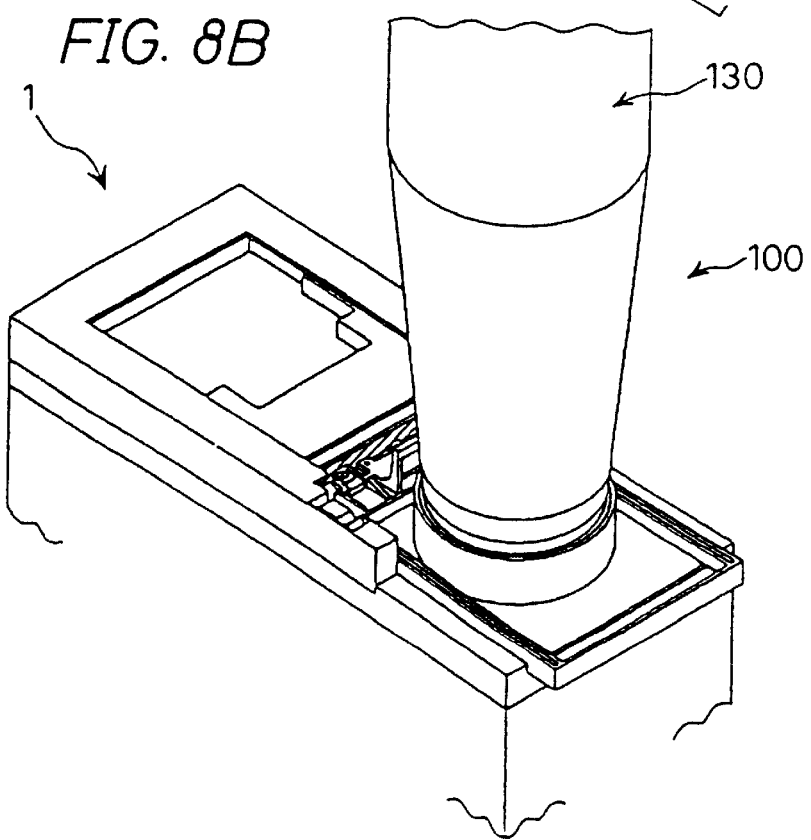

The indication image 130A, for use in detection of placement position, and the reading reference position line 130B each have a predetermined image shape. The indication image 130A may be of a trademark indicating product's name or manufacturer's name. As shown in FIGS. 8A and 8B, the toner bottle 100 is slidingly inserted into a predetermined position of the image forming apparatus 1 to supply toner.

Figure 9:
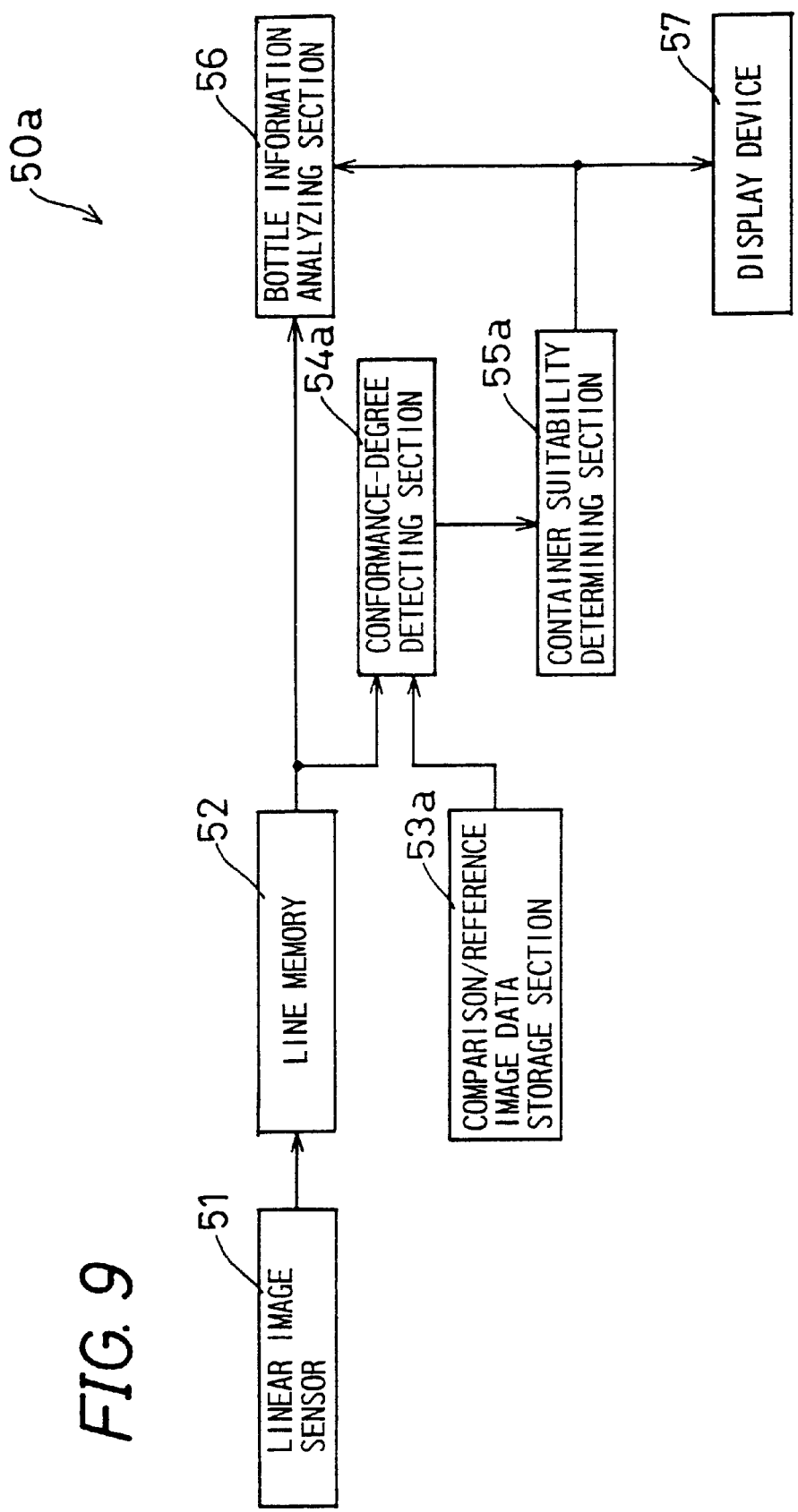
FIG. 9 is a block diagram showing an electrical configuration of a control system of a suitability detecting section incorporated in the image forming apparatus according to another embodiment of the invention.

Next, with reference to FIG. 9, a description will be given below as to a process for detecting suitability of the toner bottle 100a, performed in the image forming apparatus 1 of the embodiment.

A suitability detecting section 50a, which constitutes part of the control section 43 and acts as determining means, is composed of: a linear image sensor 51; a line memory 52; a comparison/reference image data storage section 53a acting as an image data storage section; a conformance-degree detecting section 54a acting as conformance-degree detecting means; and a container suitability determining section 55a acting as determining means.

The line memory 52 stores image data read out by the linear image sensor 51, and outputs the accumulated image data to the subsequently-described conformance-degree detecting section 54 and bottle information analyzing section 56. The comparison/reference image data storage section 53a stores image data obtained from an indication image emplaced on the adequate toner bottle 100a, namely, the first image data, which has previously been stored in accordance with the indication image 130A, in a 2-value bit data. For example, a ROM or the like is used as the comparison/reference image data storage section 53a.

The conformance-degree detecting section 54a detects, after comparing the image data about the indication image 130A read out by the linear image sensor 51, namely, the second image data, with the comparison/reference image data stored in the comparison/reference image data storage section 53a, namely, the first image data, conformance between the first and second image data.

The container suitability determining section 55a determines suitability of the toner bottle 100a with respect to the image forming apparatus, based on a conformance detection result provided by the conformance-degree detecting section 54a. Moreover, the container suitability determining section 55a outputs the determination result to a display device 57 acting as display means, such as an LCD, disposed in the operation panel of the image forming apparatus, and to the bottle information analyzing section 56.

The bottle information analyzing section 56 receives input about image data having been read out by the linear image sensor 51 and stored in the line memory 52, namely, the toner bottle 100a-specific information. Also inputted thereto is a determination result provided by the container suitability determining section 55a. That is, the bottle information analyzing section 56 stores, as historical data, the toner bottle 100a-specific information read out by the linear image sensor 51. Moreover, the bottle information analyzing section 56 stores, as information on the bottle in use, the determination result provided by the container suitability determining section 55a. The reason why such a bottle information analyzing section 56 is provided is as follows. Some toner bottles 100a have a container main body which has been reused again and again for recycling purpose. Therefore, not only it is necessary to determine suitability of components, but it is also necessary to recognize the historical status of the toner bottle 100a in order to operate the apparatus stably. The bottle information analyzing section 56 plays an important role in this respect. The bottle information analyzing section 56 functions to read the suitability, usage condition, and characteristics of the toner bottle 100a, so as to allow proper control of the apparatus without causing degradation in image quality.

Comparison between the image data read out by the linear image sensor 51, namely, the second image data, and the comparison/reference image data, namely, the first image data is made on a dot-by-dot basis, in accordance with the image reading dot pitch (resolution) offered by the linear image sensor 51.

Figure 10:
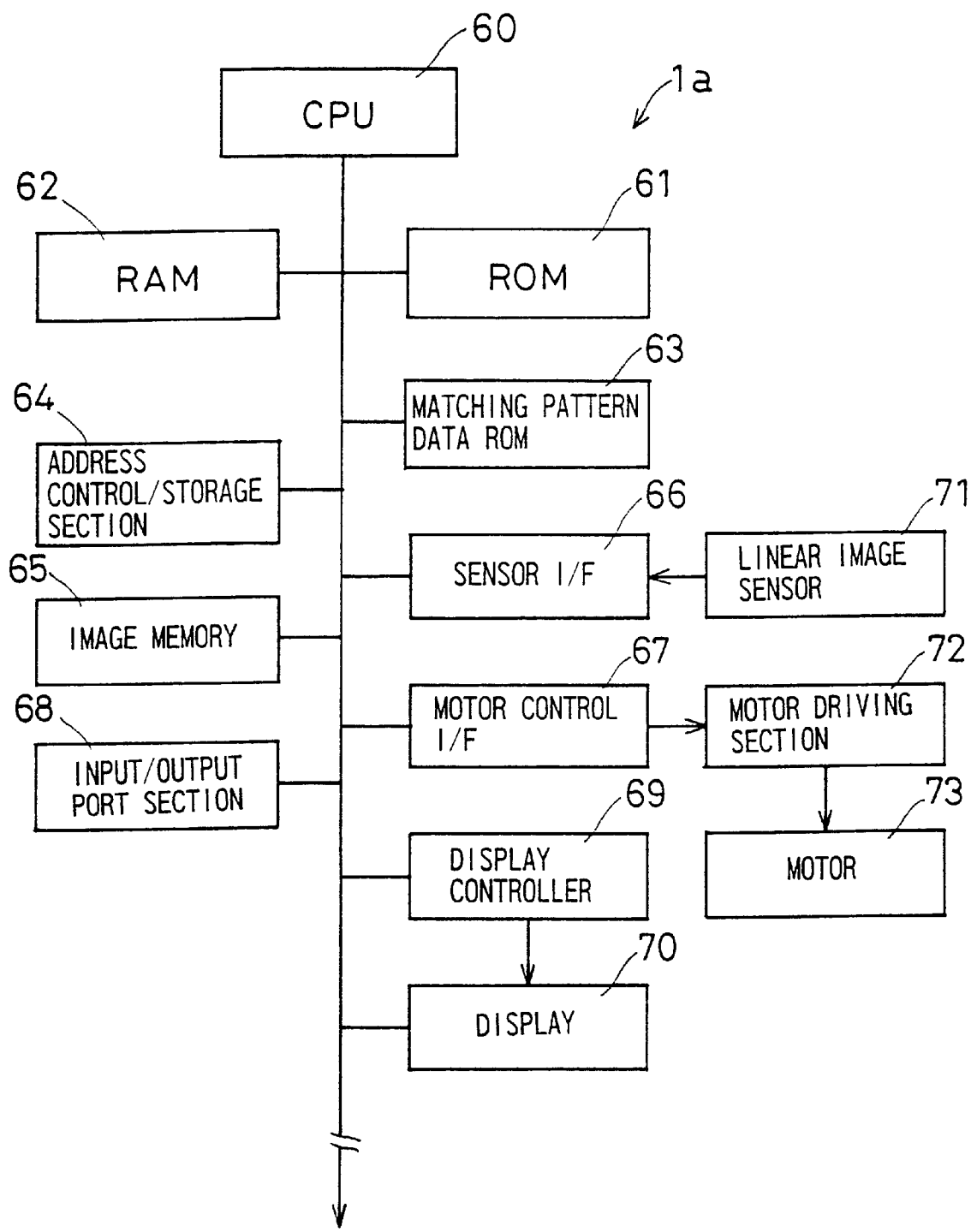
FIG. 10 is a block diagram showing the electrical configuration of the image forming apparatus according to another embodiment of the invention.

Further, with reference to FIG. 10, a description will be given below as to an example in which a microcomputer (CPU) is employed as the container suitability determining section 55a provided in an image forming apparatus 1a according to the embodiment.

The image forming apparatus 1a is composed of: a CPU 60; a ROM 61 for storing a system program; a RAM 62 acting as a working memory; a matching pattern ROM 63 for storing predetermined comparison/reference image data, namely, the first image data; an address control/storage section 64; an image memory 65 for storing image data having been read out, namely, the second image data; a sensor interface (I/F) 66; an input/output port section 68; and a display controller 69 for controlling a status of a display 70. In addition, the image forming apparatus 1a includes: a linear image sensor 71; a motor control interface 67; a motor driving section 72; and a motor 73.

The input/output port section 68 functions to input signals fed from non-illustrated sensors arranged in the individual sections of the image forming apparatus, and to output control signals to the individual operation sections of the image forming apparatus.

In the CPU 60, by executing the system program stored in the ROM 61, determination is made as to conformance between the comparison/reference image data, obtained from the adequate toner bottle 100, namely, the first image data stored in the matching pattern ROM 63, and the image data having been read out, namely, the second image data. The determination result is then outputted to the display, such as an LCD, disposed in the non-illustrated operation panel of the image forming apparatus. In the image forming apparatus 1a of the embodiment, whether or not the toner bottle 100a is a conforming product is judged in accordance with the already-explained procedure shown in FIG. 5.

In this case, in step S13, determination is made by comparing the image data obtained from the indication images A and C of the conforming product, namely, the first image data, stored in advance in the image forming apparatus, with the image data having been read out, namely, the second image data. Based on the determination result, when the toner bottle 100a is judged to be a conforming product, normal surface potential and development bias are applied, and thereby a satisfactory image is outputted.

In contrast, when the toner bottle 100a is judged to be a nonconforming product, after making a notification, the image forming apparatus is brought to a halt. This makes it possible to surely prevent improper image formation caused by loading the inadequate toner bottle 100a.

As described hereinabove, according to the image forming apparatus 1a of the embodiment, judgment on whether or not an about-to-be-loaded toner bottle is a conforming product can be made with high accuracy. This makes it possible to prevent formation of an impaired image caused by loading the inadequate toner bottle 100a.

Moreover, making use of the scanner section 2 originally provided in the image forming apparatus 1a does away with the need to additionally provide an extra determining device such as an image sensor, whereby making it possible to avoid an increase in the cost.

Further, since suitability of the toner bottle 100a is determined before it is loaded into the apparatus main body, the image sensor and the indication images 130A to 130C emplaced on the toner bottle 100a are free from contamination with toner or the like, and the indication images 130A to 130C are prevented from being erroneously read out and recognized due to improper loading of replaceable components.

Note that a procedure as shown in FIG. 4 may be adopted instead of that shown in FIG. 5. Specifically, when the toner bottle 100a is judged to be a nonconforming product, the surface potential and development bias are changed so as to output a failed image.

In this case, if image formation is carried out, with the inadequate toner bottle 100a loaded in the apparatus, a failed image is outputted. This enables the user to recognize that the toner bottle is a nonconforming product, and thus it is possible to surely prevent improper image formation caused by loading the inadequate toner bottle 100a.

As explained thus far by way of the embodiments, the method for determining suitability of a replaceable component according to the invention comprises: a step of placing a replaceable component on the original platform prior to its loading into the apparatus; a step of reading image information by optically scanning a specific part of the replaceable component, for example the readout placement surface or the indication image; a step of comparing the reading result with previously-stored image data about a conforming product; and a step of judging whether or not the replaceable component is suitable for the image forming apparatus. With this method, suitability of replaceable components can be readily and speedily determined with high accuracy by making use of highly-accurate reading capability of the scanner section.

Besides, image information belonging to the specific part of the replaceable component can include data about particulars of its stereoscopic configuration complicated to an extent that would prevent copying. This makes it possible to surely protect the image forming apparatus and the genuine product, namely, the replaceable component.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus comprising:
    an apparatus main body including an original platform for placing thereon a target to be read out and image reading means for reading image information on the target to be read out, to which a replaceable component is detachably attached; and
    control means for determining suitability of the replaceable component, the control means driving the image reading means to optically scan the replaceable component, which has been placed on the original platform prior to being loaded into the apparatus main body, to read image information, and then judging whether or not the replaceable component is suitable for the image forming apparatus based on a reading result.

2. The image forming apparatus of claim 1,
    wherein the replaceable component is placed in a given position on the original platform, and image information is read out by the image reading means.

3. The image forming apparatus of claim 1,
    wherein the replaceable component has, at least on its planar portion, one or more readout surfaces including a character or mark, and image information on the readout surface is read out by the image reading means.

4. The image forming apparatus of claim 1,
    wherein the apparatus main body is provided with storage means for storing in advance image data for reference, as image information indicating visual characteristics of the replaceable component fit for the apparatus,
    and wherein the control means determines suitability of the replaceable component by comparing the image information on the visual characteristics of the replaceable component read out by the image reading means to the reference image data stored in advance in the storage means.

5. The image forming apparatus of claim 1,
    wherein the control means functions to suspend image forming operations during image reading and image processing required for determining suitability of the replaceable component.

6. The image forming apparatus of claim 1, wherein the replaceable component is an image forming unit.

7. The image forming apparatus of claim 1, wherein the replaceable component is a toner supplying container.

8. The image forming apparatus of claim 1, wherein the replaceable component is a process cartridge.

9. The image forming apparatus of claim 1, wherein the replaceable component is a development cartridge.

10. The image forming apparatus of claim 1, wherein, at an instant when unsuitability is proved based on the reading result, the control means functions to degrade image forming performance.

11. The image forming apparatus of claim 1, further comprising:
    notification means for giving a warning using legends or sound output at an instant when unsuitability is proved by the control means based on the reading result.

12. The image forming apparatus of claim 1,
    wherein, at an instant when unsuitability is proved based on the reading result, the control means functions to suspend image forming operations.

13. The image forming apparatus of claim 1,
    wherein the image reading means performs reading on an original placed on the original platform, or an indication image emplaced on each replaceable component which is detachably attached relatively to the apparatus main body, by means of optical scanning,
    and wherein the control means includes: an image data storage section in which first image data, obtained from an indication image emplaced on a replaceable component for the image forming apparatus, is stored in advance; conformance-degree detecting means for detecting, after comparing the first image data with second image data obtained from the indication image read out by the image reading means, conformance between the first image data and the second image data; and determining means for determining suitability of the replaceable component based on a detection result provided by the conformance-degree detecting means.

14. The image forming apparatus of claim 13, wherein the replaceable component is a printing-toner container.

15. The image forming apparatus of claim 14,
    wherein the indication image is composed of at least one of a character, a mark, and a bar code.

16. The image forming apparatus of claim 14,
    wherein the control means judges whether or not the replaceable component is suitably used for the apparatus based on image information on the indication image, composed of at least one of a character, a mark, and a bar code, emplaced on the replaceable component that has been read out by the image reading means.

17. The image forming apparatus of claim 13, further comprising:
    display means for displaying determination results provided by the determining means, based on the image information on the indication image read out by the image reading means.

18. The image forming apparatus of claim 13,
    wherein, at an instant when unsuitability is proved based on a determination result provided by the determining means, the control means functions to suspend the operation of the image forming apparatus.

19. The image forming apparatus of claim 13,
    wherein, at an instant when unsuitability is proved by the determining means, the control means functions to change the operation mode or various image-formation parameters of the image forming apparatus in such a way that image forming performance is degraded.

20. A method for determining suitability of a replaceable component, comprising the steps of:
    placing a replaceable component on an original platform of an image forming apparatus prior to its loading into an apparatus main body of the image forming apparatus;

reading image information by optically scanning a specific part of the replaceable component;

comparing a reading result with previously-stored image data about a conforming product; and judging whether or not the replaceable component is suitable for the image forming apparatus.

* * * * *